United States Patent Office 3,527,604

Patented Sept. 8, 1970

3,527,604

COLORPROOFING MATERIALS COMPRISING p-BENZOQUINONE DIAZIDE

Fritz Endermann, Wiesbaden, and Fritz Uhlig and Jürgen Braun, Wiesbaden-Biebrich, Germany, assignors to Kalle Aktiengesellschaft, Wiesbaden-Biebrich, Germany, a corporation of Germany No Drawing. Filed May 20, 1966, Ser. No. 551,516
Claims priority, application Germany, May 22, 1965, K 56,192
Int. Cl. G03c *1/52*
U.S. Cl. 96—27 9 Claims

ABSTRACT OF THE DISCLOSURE

Materials useful in proofing color separation negatives and the like are prepared by coating a transparent base with a composition including a p-benzoquinonediazide and an alkali-fast dye of a primary color normally used in colorproofing. Imagewise exposure of the material to light according to a color separation negative with subsequent washing with aqueous alkaline solution provides a faithful color representation of such negatives.

The present invention relates to materials for proofing color-separation negatives employed in the preparation of printing plates, and the method of using the same.

In the preparation of colored reproductions of colored originals by color printing the printer uses various auxiliary copies which enable him to assess the complicated working procedure as early as possible and among which are classed the so-called colorproofing materials and registration guides.

Colorproofing foils have previously been suggested comprising transparent, colorless supports which have been rendered light-sensitive by application of a coating containing a diazonium salt and coupling component. After exposure to light under a color separation negative, the foil is developed in an ammonia atmosphere to produce a colored image (diazotype process). The azo dyes which are formed in the image areas have not faithfully reproduced the basic colors required in colorproofing and as a result this process did not succeed in becoming widely adopted.

Another method of preparing colorproofing materials has been suggested in U.S. Pat. 2,993,788 and includes post-dyeing of light-sensitive films. Better colors are obtained than previously; however, this process, in which it is necessary to carry out sensitization by hand a number of times and which is therefore very time-consuming and subject to major sources of error, for example in regard to coating thickness, has not found any practical application.

An object of the present invention is the preparation of light-sensitive materials useful in a simple process for colorproofing separation negatives. A further object is the simple colorproofing of color separation negatives. Yet another object of the invention is the preparation of registration guides useful in the making of printing plates.

The light-sensitive materials according to the invention comprise a support and a coating on the support of a light-sensitive composition comprising a dye of a basic color used in colorproofing and a light-sensitive material having a substantially different selective solubility than its light-decomposition-products. The materials of the present invention are further characterized in that the coatings contain as light-sensitive substances p-benzoquinonediazide compounds or p-benzoquinoneiminodiazide compounds, or mixtures thereof. In addition, the dye employed should be resistant, or "fast," to aqueous wash solutions which may be acid or alkaline, as will be later described in more detail.

The preparation of the light-sensitive materials with the photocopying coatings characterized above involves no difficulties and can be easily accomplished according to methods known and usual in the art for the formation of coatings on supports in the form of films, sheets and the like.

Although opaque papers and webs may be used, it is preferred to use as coating supports, colorless, preferably clearly transparent plastics films which, in particular also for the achievement of unobjectionable images, should be as dimensionally stable as possible under the process conditions. Suitable are, above all, polyester films, among which biaxially oriented films of polyethyleneterephthalate are preferred. Acetate, polyvinylchloride or polyalkylene films, such as polyethylene or polypropylene films, are used with likewise good results. The films, may, if desired, for example, in order to achieve better adhesion of the light-sensitive coatings, be subjected to a pretreatment before coating.

The sensitizing mixtures which are necessary for the formation of the photocopying coating according to the invention on the support and which are applied and dried are prepared from an organic solvent, one or several p-benzoquinonediazides or p-benzoquinoneiminodiazides, or a mixture thereof, and at least one of the dyes characterized above. To these may be added, in conventional manner, resins, plasticisers, activators and other additives or auxiliaries usual for light-sensitive diazotype coatings but these additions are in general unnecessary.

Suitable p-benzoquinonediazide compounds or p-benzoquinoneiminodiazide compounds the use of which yields excellent shelf life of the sensitizing mixtures, especially also in the form of the dried coating, correspond to one of the general fundamental formulae.

$$O{=}R{=}N{\equiv}N \quad \text{or} \quad R'{-}N{=}R{=}N{\equiv}N$$

wherein R stands for a quinoid ring formed from a benzene ring and R' stands for aryl or acyl.

In this connection, by the expression "acyl" are meant not only radicals of carboxylic acids but also the corresponding radicals of sulphonic acids, e.g. arylsulphonyl.

Particularly useful are sulphonic acid esters and sulphonic acid amides which are derived from the above fundamental formulae. They are described, for example, in German Patents Nos. 901,500, 960,335, 1,053,930 and 1,104,824.

The dyes to be used acording to the invention are dyes which are fast to alkali and acid and which do not change their hue under the influence of dilute alkaline and acid solutions. They should be soluble in organic solvents and should correspond as nearly as possible to the standard colors used in colorproofing, i.e. yellow, red (magenta) and blue (cyan). A standarized black is also frequently required in the colorproofing process. Preferably, dyes are used whose hue corresponds to those of DIN Color Chart 16,508, for example Fat Yellow 5G (C. Suppl. 572), Fat Yellow 3G (C. 2822), Celliton Yellow 3G (C. 3401), Fat Red G (C. 2843), Fat Red HRR, Fat Red 5B (C. 2851), Fat Black HB (C. 2899) and, further, Zapon Fast Black RE (C. Suppl. 121), Zapon Fast Black B. (C. Suppl. 121), Zapon Fast Blue HFL (C. 2880), Zapon Fast Blue FLE (C. Suppl. 593), Zapon Fast Red BB (C. 2864), Zapon Fast Red BE (C. 2845), Zapon Fast Fire Red B (C. Suppl. 593), Zapon Fast Red GE (C. Suppl. 584), Zapon Fast Yellow G (C. 2827), Zapon Fast Yellow GR (C. 2823) and mixtures thereof. The numbers prefixed by the letter "C" which appear after the names of the dyes denote the relevant page number in the Color Index, part I, second edition (1956). The numbers prefixed by "C. Suppl." which appear after the names of the dyes denote the page numbers in the Color Index, Part I, second edition, Supplement 1963. Fat Red HRR is an azo dye of the empirical formula $C_{22}H_{16}N_4O$, prepared by coupling of 1 mole of p-aminoazobenzene with 1 mole of beta-naphthol.

When dyes other than those mentioned above are used which are fast to alkali and soluble in organic solvents and whose colors conform to the standard color charts usual in countries other than Germany, the use of such dyes lies within the scope of the invention.

Examples of suitable organic solvents are glycol ethers, such as glycolmonomethylether and glycolmonoethylether; esters, such as butyl acetate and amyl acetate; esters, such as dioxan; ketones, such as methylethyl ketone and cyclohexanone and, further, dimethylformamide as well as mixtures of these compounds.

The quinonediazide(s) and the dye are dissolved in the organic solvent or solvent mixture and, together with this, form the sensitizing mixture according to the invention which is applied to the support, such as plastic film, and dried.

The concentrations of the dyes in the sensitizing mixtures according to the invention may vary within relatively wide limits from 0.1% to 5%, preferably 1% to 3%, with reference to the weight of the total mixture. The proportion by weight of p-benzoquinonediazide or p-benzoquinoneiminodiazide to dye is 1:0.1 to 1:5, and preferably 1:0.5 to 1:2.

If colorproofing foils are being prepared, the dried, light-sensitive coatings are exposed under a photographic negative or positive original with ultraviolet light.

As originals, screened negative silver film color separations which have been prepared from a colored original in a reproduction camera are preferably used. There is used in each case the color separation which corresponds to the dye of the sensitized plastics film according to the invention, i.e., a light-sensitive yellow plastics film is exposed under the yellow silver film separation, a light-sensitive red plastics film under the red silver film separation, etc. After exposure, the diazo compound together with the dye in the areas not affected by light are dissolved away, depending on the solubility of the diazo compound used, with water or with a generally 0.5 to 5% aqueous, weakly alkaline or weakly acid solution, i.e. the coating is developed. A reversed image (negative) of the original used remains on the support and forms a proof of the original in a basic color corresponding to the separation used.

As alkaline substances, there are used, for example, alkali metal silicates, alkali metal phosphates, alkali metal carbonates and/or organic bases, such as ethanolamines, alkylamines and alkylenediamines and, as acid substances, for example phosphoric acid, tartaric acid, citric acid, lactic acid, gum arabic and/or alginic acid. The developed films are dried, and colored images are obtained which, when the cyan, magenta, yellow and, in some cases, black color separation copy which has been prepared are placed over one another in precise register, either correspond exactly to the colored original or provide a basis for rapid correction of the silver films by one of the conventional after-treatments.

The photocopying material sensitizing mixture according to the invention, and the films coated therewith, can be stored for months, can be prepared rapidly and without technical effort and can be used in a work-saving manner. The use of the material according to the invention relieves the printer of hitherto necessary preparatory operations.

For the colorproofing process with colorproofing foils there results from the invention the great advance that in color printing the expensive and time-consuming machine proofing hitherto necessary can be saved in offset and frequently also in gravure and relief printing. In addition, an idea is very quickly gained in the printing plant of the color to be expected when printing later on and this can be corrected immediately without—as was hitherto frequently necessary—having to stop a printing run already in progress, which stoppages are attended by losses of material, time and energy.

The copies prepared from the light-sensitive plastic films according to the invention with blue dye in the light-sensitive coating are also well suited for use as registration guides. As is known, in the reproduction of colored originals in offset, gravure and relief printing the usual procedure is that firstly the original provided with register crosses is exposed by means of a reproduction camera through a screen and color filter on to silver film three or four times in sucession. For example, for one exposure a blue filter is used, for the second a green filter and for the third a red filter and in most cases a fourth exposure without a color filter is also made. After development of the films, the silver film color separations are obtained. Each of these color separations serves as original for the exposure of one light-sensitive printing plate in each case.

After development of the exposed printing plates, printing plates are obtained which correspond to the four silver film color separations and from which printing can then be effected for example in a color printing machine. The exposure of the printing plates must be carried out very carefully in order that in the machine the resulting different printing plates contact successively as exactly as possible at the same points the material which is to be printed.

In order to achieve this, different methods of mounting are usual when exposing the printing plates. The highest accuracy of register of the composite is achieved by preparing a blue foil, i.e. an image of the original in which the image areas are blue and the non-image areas uncolored, as so-called registration guide. The function of the blue foil as registration key for mounting in color printing consists, for example, in that the silver film color separations are successively brought into alignment with the blue foil, preferably with the aid of the register crosses or image edges on all color separations and on the blue foil. The blue foil may be exposed together with the respective silver film color separation, because the foil does not cover against the usual shortwave light. An uncoated, transparent foil may also be laid over the blue foil and the silver film color separations successively positioned in register therewith and the blue foil then removed from the transparent foil before exposure. The originals thus mounted then permit exposure of the printing plates in precise register and thus also printing in precise register on the material to be printed in the printing machine. In this last-described method of assembly a plastics film according to the invention which has been dyed red can also be used as so-called reference copy.

EXAMPLE 1

1 g. of 1-[(4′-methylbenzene-1′-sulphonyl) - imino]-2-(2″,5″ - dimethyl - phenylamino - sulphonyl) - benzoquinone (1,4)-diazide-(4), prepared according to Example 1 of German Pat. No. 1,104,824, and 1.0 g. of Zapon Fast Blue HFL are dissolved in 50 g. of glycolmonomethylether, 20 g. of butyl acetate and 30 g. of methylethyl ketone.

A web of polyester film is coated with this solution by roller application and dried in a heated channel. The sensitized roll is cut into suitable sizes which, kept in the dark, can be stored for months.

For the colorproofing process, the blue coloured film is exposed, for example at a 60-ampere arc lamp at a distance of 110 cm. for about 3 minutes, under a screened silver film blue separation prepared in the reproduction camera by means of a red filter. The applied coating is removed in the unexposed areas by wiping over with a pad of cotton wool which is soaked with an aqueous solution of 1.5% sodium silicate and 1.5% trisodium phosphate. The developed film is washed with water and dried and there is then obtained a negative, storable, blue colored image of the silver film original, the color of said image corresponding to the standard blue of DIN 16,508.

To prepare a registration guide from the blue colored light-sensitive film material described above, a sheet of the said material is exposed in the manner described above under a screened silver film separation prepared in the reproduction camera by means of a filter and provided with register crosses and the material is then developed as described above. A negative, storable, blue colored image of the blue silver film separation is obtained, with the usual register crosses, which contains in the colored areas a mixture consisting of the light-decomposition product of the 1-[(4′-methylbenzene - 1′ - sulphonyl)-imino]-2 - (2″,5″ - dimethyl - phenylaminosulphonyl)-benzoquinone-(1,4)-diazide-(4) and Zapon Fast Blue HFL.

For use as registration guide, on this blue colored image there is secured for example a yellow silver film separation of the original (the separation having been obtained under a blue filter in a reproduction camera), so that register cross lies precisely uppn register cross or image edge precisely upon image edge. The composite is laid upon a light-sensitive printing plate and exposed with an arc lamp. After the customary development and inking up of the printing plate, this is ready for printing with yellow printing ink in a printing machine. The composite consisting of the blue registration guide and the yellow separation is taken apart and the procedure repeated successively with the red silver film separation, the blue silver film separation and, if four-color printing is intended, also with the diapositive of the colored original, i.e. the diapositive obtained without color filter.

There may be used in the same way a light-sensitive plastics film for the preparation of which a sensitizing mixture is used which contains, instead of the diazo compound mentioned above, benzoquinone-(1,4)-diazide-(4)-2(N-beta-naphthyl)-sulphonamide prepared according to Example 2 of German Pat. No. 960,335.

EXAMPLE 2

1 g. of 1-[(4′-methylbenzene-1′-sulphonyl)-imino]-2-(2″ - ethylphenylamino - sulphonyl) - benzoquinone - (1, 4)-diazide-(4)-cf. German Pat. No. 1,104,824, Formula 66, and 1 g. of Fat Yellow 5G are dissolved in 80 g. of glycolmonomethylether and 20 g. of butyl acetate. With this sensitizing solution, a biaxially oriented polyethylene-terephthalate film is rendered light-sensitive according to the information given in Example 1. After drying, the sensitized plastics film can be stored for a long time and can be used for the preparation of a yellow colorproofing foil by development with a 2% trisodium phosphate solution after exposure.

EXAMPLE 3

1 g. of benzoquinone - (1,4) - diazide - (4) - 2 - sulphonic acid-(ethylphenyl)-amide (prepared analogously to Example 1 of German Pat. No. 960,335) and 0.75 g. of Zapon Fast Red BE are dissolved in a mixture consisting of 50 g. of glycolmonomethylether, 30 g. of methylethyl ketone and 20 g. of butyl acetate, and with this solution a red colored colorproofing foil is prepared according to the particulars given in Example 1, but development is effected with an aqueous solution which contains 1.5% of phosphoric acid and 2% of gum arabic.

A negative, red colored image of the silver film separation used as original is obtained, the color of which corresponds substantially to the standard red of DIN 16,508.

There may be used in the same way a plastics film according to the invention for the preparation of which benzoquinone - (1,4) - diazide - (4) - 2 - (N-alpha-naphthyl-beta-ethoxy-(sulphonamide (prepared analogously to Example 13 of German Pat. No. 960,335) was used instead of the diazo compound mentioned above.

EXAMPLE 4

1 g. of benzoquinone-(1,4)-diazide-(4)-2-(N-beta-naphthyl)-sulphonamide (prepared according to Example 2 of German Pat. No. 960,335) and 2 g. of Sudan Deep Black BB are dissolved in 97 g. of glycol monomethylether and with this solution a light-sensitive plastics film is prepared from which a black coloured colorproofing foil is obtained according to the particulars given in Example 1.

When the colorproofing foils prepared according to Examples 1 to 4 are laid over one another in precise register, a duplicate is formed which corresponds to the original of the silver film separations and reproduces faithfully the colours of the said original.

The German patents referred to in the foregoing specification correspond to the following U.S. patents:

DBP 901,500—U.S. Pat. No. 2,759,817
DBP 960,335—U.S. Pat. No. 2,754,209
DBP 1,053,930—U.S. Pat. No. 3.050,387
DBP 1,053,930—U.S. Pat. No. 3,050,387
DBP 1,104,824—U.S. Pat. No. 3,175,906 and U.S. Pat. No. 3,180,732.

The above examples have been presented for the purpose of illustration and should not be taken to limit the scope of the present invention. It will be apparent that the described examples are capable of many variations and modifications which are likewise to be included within the scope of the present invention as set forth in the appended claims.

What is claimed is:

1. A method of colorproofing a colour separation transparency which comprises:

(a) providing a light-sensitive sheet comprising:
  (1) a support, and
  (2) a light-sentitive coating on said support comprising an intimate mixture of a light-sensitive component consisting of a p-benzoquinonediazide or p-benzoquinoneimino-diazide, and an alkali fast dye of a basic colour selected from the group of standard yellow, blue and red colours used in color proofing;
(b) exposing said sheet to actinic light through said color separation transparency;
(c) contacting the coating of the sheet so exposed with a weakly alkaline aqueous solution; and
(d) washing the coating to remove the coated composition from the non-light-struck areas; whereby a colored dye image corresponding to said original remains on said support.

2. A method according to claim 1 wherein said support is a transparent film.

3. A method according to claim 1 wherein said light-sensitive component is a compound of the general formulae:

$$O{=}R{=}N{\equiv}N$$

or $$R'{-}N{=}R{=}N{\equiv}N$$

wherein R is is a quinoid ring, and R′ is an acyl or aryl.

4. A method according to claim 1 wherein said light sensitive component is 1-[(4′-methylbenzene-1′-sulphonyl)-imino]-2-(2″, 5″-dimethyl - phenylamino - sulphonyl)-benzoquinone (1, 4)-diazide-(4).

5. A method according to claim 1 wherein said light-sensitive component is 1-[(4′-methylbenzene-1′-sulphonyl) - imino] - 2-(2″-ethylphenylamino - sulphonyl)-benzoquinone-(1-4)-diazide-(4).

6. A method according to claim 1 wherein said light-sensitive component is benzoquinone-(1,4)-diazide-(4)-2-sulphonic acid-(ethylphenyl)-amide.

7. A method according to claim 1 wherein said light-sensitive component is benzoquinone - (1,4) - diazide-(4)-2(N-beta-naphthyl)-sulphonamide.

8. A method according to claim 1 wherein said light sensitive component is benzoquione-(1,4)-diazide-(4)-2-(N-alpha-naphthyl-beta-ethoxy)-sulphonamide.

9. A method of proofing separation transparencies of a multicolor original which comprises:

(a) providing a first light-sensitive sheet comprising:
    (1) a transparent support, and
    (2) a light-sensitive coating on said support, said coating comprising an intimate mixture of a light-sensitive p-benzoquinone-diazide or p-benzoquinoneiminodiazide and an alkali fast dye of a basic colour selected from the group consisting of standard yellow, blue, and red colours used in color proofing, and corresponding to a first basic color of said original;

(b) exposing said first sheet to actinic light through the separation transparency corresponding to said first basic color of said original:

(c) providing a second light-sensitive sheet comprising:
    (1) a transparent support, and
    (2) a light-sensitive coating on said support, said coating comprising an intimate mixture of a light-sensitive p-benzoquininediazide or p-benzoquinoneiminodiazide and an alkali fast dye of a basic color selected from the group consisting of standard yellow, blue and red colors used in colour proofing, and corresponding to a second basic colour of said original, (d) exposing said second sheet to actinic light through the separation transparency corresponding to said second basic color of said original;

(e) contacting the coatings of the sheets so exposed with an aqueous solution;

(f) washing the coatings so contacted to remove the coated compositions from the non-light-struck areas whereby colored images of the corresponding separation transparency images remain on the respective sheets; and (g) overlaying the washed sheets in registration according to the proper registry of said separation transparencies.

References Cited

UNITED STATES PATENTS

| | | | |
|---|---|---|---|
| 2,754,209 | 7/1956 | Schmidt et al. | 96—33 |
| 3,175,906 | 3/1965 | Siis et al. | 96—33 |
| 3,130,047 | 4/1964 | Uhlig et al. | 96—33 |
| 3,326,682 | 6/1967 | Endermann et al. | 96—23 |

NORMAN G. TORCHIN, Primary Examiner

J. R. HIGHTOWER, Assistant Examiner

U.S. Cl. X.R.

96—91